United States Patent [19]

Winter et al.

[11] Patent Number: 5,637,666
[45] Date of Patent: Jun. 10, 1997

[54] POLYOLEFIN MOLDING COMPOSITION FOR PRODUCING FIBERS, FILAMENTS AND WEBS BY MELT SPINNING

[75] Inventors: Andreas Winter, Glashütten/Ts.; Annette Vollmar, Frankfurt am Main; Friedrich Kloos, Mainz; Bernd Bachmann, Eppstein/Taunus, all of Germany

[73] Assignee: Hoechst Aktiengesellschaft, Frankfurt am Main, Germany

[21] Appl. No.: 389,811

[22] Filed: Feb. 10, 1995

Related U.S. Application Data

[63] Continuation of Ser. No. 159,905, Dec. 1, 1993, abandoned.

[30] Foreign Application Priority Data

Dec. 2, 1992 [DE] Germany ............... 42 40 411.8

[51] Int. Cl.$^6$ ............... C08F 10/06; C08F 10/02
[52] U.S. Cl. ............... 526/351; 526/160; 526/348; 526/348.2; 526/348.3; 526/348.6
[58] Field of Search ............... 526/351, 160, 526/348, 348.2, 348.6

[56] References Cited

U.S. PATENT DOCUMENTS

| | | | |
|---|---|---|---|
| 3,991,244 | 11/1976 | Debbas | 428/113 |
| 4,086,381 | 4/1978 | Cheshire | 428/113 |
| 4,384,098 | 5/1983 | Hagler | 526/348.1 |
| 4,902,462 | 2/1990 | Bert | 264/103 |
| 5,002,815 | 3/1991 | Yamanaka | 428/109 |
| 5,017,658 | 5/1991 | Noma | 525/195 |
| 5,145,819 | 9/1992 | Winter | 502/117 |
| 5,243,001 | 9/1993 | Winter et al. | 526/127 |

FOREIGN PATENT DOCUMENTS

| | | |
|---|---|---|
| 2080576 | 4/1993 | Canada . |
| 2084015 | 5/1993 | Canada . |
| 2084017 | 5/1993 | Canada . |
| 0028844A2 | 5/1981 | European Pat. Off. . |
| 0111383A1 | 6/1984 | European Pat. Off. . |
| 0302424A1 | 2/1989 | European Pat. Off. . |
| 0485823A1 | 5/1992 | European Pat. Off. . |
| 0593888A1 | 4/1994 | European Pat. Off. . |
| WO94/28219 | 12/1994 | WIPO . |

OTHER PUBLICATIONS

G. Odian, "Principles of Polymerization" (1991), 619, Wiley (New York).

*Primary Examiner*—Fred Zitomer
*Attorney, Agent, or Firm*—John M. Genova

[57] ABSTRACT

Polyolefin molding composition comprising a polyolefin formed from an olefin having at least 3 carbon atoms of the formula $R^a$—CH═CH—$R^b$, where $R^a$ and $R^b$ are identical or different and each is hydrogen or $C_1$–$C_{15}$-alkyl, straight-chain or branched, or $R^a$ and $R^b$ together with the atoms joining them together form a ring system, and from 0 to 10% by weight of ethylene or of a second olefin have the abovementioned meaning as comonomer, characterized by a 230/2.16 MFI from 5 to 1000 g/10 min, a 230/5 MFI from 15 to 3000 g/10 min, a molecular weight ($M_w$) from 75,000 to 350,000 g/mol, a polydispersity ($M_w/M_n$) from 1.8 to 3.5, a viscosity number from 70 to 300 cm$^3$/g, a melting point from 120° to 165° C., an isotactic block length from 25 to 150, and ether extractables less than 2% by weight, based on the total weight of the polymer.

16 Claims, No Drawings

POLYOLEFIN MOLDING COMPOSITION FOR PRODUCING FIBERS, FILAMENTS AND WEBS BY MELT SPINNING

This is a continuation of application Ser. No. 08/159,905 filed on Dec. 1, 1993 now abandoned.

The invention relates to a polyolefin molding composition for melt spinning applications.

The use of polyolefins in melt spinning processes is known. The polyolefins such as polypropylenes used for such applications are chemically treated with a peroxide in an additional step following polymerization.

These molding compositions, which are known as CR polymers (CR=controlled rheology), have two serious disadvantages:

1) the additional peroxide step adds to the cost of the products, and 2) the reaction with peroxide gives rise to low molecular weight fragments which have an unpleasant odor which may attach to the fiber produced from the polymer, too.

In addition, the peroxide process can cause yellowing of the polymer.

Such products have only limited usefulness for high speed spinning applications (danger of filament strand breakage). Polyolefins such as polypropylenes which have not been given a chemical treatment with peroxide are unsuitable for high speed spinning processes because filament strand breakage occurs there even at low take-off speeds.

It is an object of the present invention to provide a molding composition which does not have the disadvantageous properties of the prior art, i.e. a molding composition which does not need the disadvantageous peroxide step and, what is more, can be used in high speed spinning processes too.

It has been found that certain polyolefin molding compositions which are preferably preparable by polymerization using metallocene catalysts meet the stated requirements without further conditioning steps such as a peroxide process.

It has further been surprisingly found that these polyolefin molding compositions of the invention can be melt-spun into fibers, filaments or webs at distinctly lower melt temperatures at the spinneret plate than conventional CR polymers, in a direct comparison, so that the energy saving makes it possible to cut the processing costs appreciably. Moreover, the fibers and filaments produced from the molding compositions of the invention are notable for a distinctly higher tenacity and the webs produced therefrom have higher tensile strength.

The present invention thus provides a polyolefin molding composition comprising a polyolefin formed from an olefin having at least 3 carbon atoms of the formula $R^a$—CH=CH—$R^b$, where $R^a$ and $R^b$ are identical or different and each is hydrogen or $C_1$–$C_{15}$-alkyl, straight-chain or branched, or $R^a$ and $R^b$ together with the atoms joining them together form a ring system, and from 0 to 10% by weight of ethylene or of a second olefin have the abovementioned meaning as comonomer, characterized by a 230/2.16 MFI from 5 to 1000 g/10 min, a 230/5 MFI from 15 to 3000 g/10 min, a molecular weight ($M_w$) from 75,000 to 350,000 g/mol, preferably from 80,000 to 250,000 g/mol, a polydispersity ($M_w/M_n$) from 1.8 to 3.5, preferably from 2.0 to 3.0, a viscosity number from 70 to 300 cm$^3$/g, preferably from 100 to 250 cm$^3$/g, a melting point from 120° to 165° C., preferably from 140° to 165° C., an isotactic block length $n_{iso}$ from 25 to 150, preferably from 30 to 150, and ether extractables less than 2% by weight, preferably less than 1% by weight, based on the total weight of the polymer.

The production of polyolefins which are suitable for the molding compositions of the invention is known (e.g. EP 537 686 A1, EP 549 900 A1, EP 545 303 A1, EP Application 93109966.7).

They are high molecular weight isotactic polyolefins, in particular polypropylene and propylene-containing copolymers.

In addition to the polyolefin the molding composition of the invention may contain the customary additives, for example nucleating agents, stabilizers, antioxidants, UV absorbers, photoprotectants, metal deactivators, free-radical scavengers, glidants, emulsifiers, pigments, optical brighteners, flame retardants or antistats.

The molding composition of the invention is preferably produced using metallocene catalysts, in particular using zirconocenes with substituted indenyl systems as ligands.

The molding composition of the invention is notable not only for the absence of unpleasant odor and yellowing but also for a higher tenacity of the filaments and fibers and a lower processing temperature compared with conventional polyolefins.

A particularly preferred field of use for the molding compositions of the invention is in spunbonded web production and in filament production at high take-off speeds.

The following examples illustrate the invention:

| | |
|---|---|
| $M_w$ | = Weight average molecular weight (g/mol), determined by gel permeation chromatography |
| $M_w/M_n$ | = Polydispersity, determined by gel permeation chromatography |
| II | = Isotactic index ($^{13}$C-NMR spectroscopy) |
| $n_{iso}$ | = Average isotactic block length ($^{13}$C-NMR spectroscopy) |
| $n_{PE}$ | = Average block length of polyethylene ($^{13}$C-NMR spectroscopy) |
| VN | = Viscosity number, measured at 135° C. on a 0.1% strength solution in decahydronaphthalene, in capillary viscometer |
| MFI (230/5) and MFI (230/2.16) | = Melt flow index at 230° C. under 5 kg and 2.16 kg load respectively (DIN 53735) |

| Melting point determination by DSC (20° C./min) | |
|---|---|
| Linear density | = Mass per unit length, in g/10,000 m (dtex) |
| Tenacity and ) extensibility ) | = Measured to DIN 53834 Part 1 (Tenacity in cN/tex; extensibility in %) |

| | |
|---|---|
| | Melting point determination by DSC (20° C./min) |
| Jet stretch ratio | = Take-off speed / Extrusion speed |
| BIH | = Ball indentation hardness (on the line of DIN 53456; 4 mm test specimen, 240° C. injection molding temperature) |
| Tensile modulus of elasticity | = Secant value to DIN 53497-Z |
| Izod impact strength | = To ISO 180/1C (measured at 20° C.) |
| Standard yellowness (SY) | = To ASTM D 1925 - 77, DIN 6167 (test specimens: injection molded plaques 80 × 80 × 2 mm) |

A Polymerizations

The metallocene catalysts were prepared as described for example in U.S. Pat. No. 5,145,819. The molding composition of the invention can be prepared using any suitable catalyst system and any suitable polymerization process as long as the molding composition of the invention meets the definition of its properties.

EXAMPLE 1

A dry 150 dm$^3$ reactor was purged with propylene and charged at 20° C. with 80 dm$^3$ of a naphtha cut of boiling range 100° to 120° C. 50 l of liquid propylene were added, followed by 64 cm$^3$ of methylaluminoxane solution (solution in toluene, corresponding to 100 mmol of Al). The reactor contents were brought to 40° C. and hydrogen was metered in until a content of 1.3% by volume had been reached in the gas space of the reactor. 17.8 mg of rac-dimethylsilylbis(2-methyl-1-indenyl)zirconiumdichloride were dissolved in 32 mol of tolueneic methylaluminoxane solution (corresponding to 50 mmol of Al) and added to the reactor. While the hydrogen content of the reactor was kept constant at 1.3±0.5% by volume, the contents were left at 40° C. for 18 h to polymerize. The polymerization was terminated with CO$_2$ gas and the polymer suspension was discharged into a downstream reactor. The suspension medium was separated from the polymer powder via a filter stick and by steam distillation, and the aqueous polymer suspension was separated from water via a pressure filter nutsche. The powder was dried at 80° C./100 mbar for 24 h. Yield: 20.5 kg.

The powder was found to have the following data:
MFI (230/5)=94 g/10 min; VN=146 cm$^3$/g;
$M_2$=174 500 g/mol; $M_w/M_n$=2.2;
Melting point 150° C., II=96.5%, $n_{iso}$=54.

EXAMPLE 2

Example 1 was repeated with a hydrogen concentration of 2.5±0.3% by volume and 21.3 mg of metallocene, affording 22.5 kg of powder.

The powder was found to have the following data:
MFI (230/5)=194 g/10 min; VN=125 cm$^3$/g;
$M_w$=148 500 g/mol, $M_w/M_n$=2.2;
Melting point 150° C., II=96.7%, $n_{iso}$=55.

EXAMPLE 3

Example 2 was repeated with the metered addition of 250 g of ethylene at a uniform rate throughout the total polymerization time of 15 hours, affording 19.1 kg of powder.

The powder was found to have the following data:
ethylene content 1.2% by weight, $n_{PE}$<1.2 (i.e.: the majority of the ethylene units were incorporated isolated).

MFI (230/5)=165 g/10 min; VN=142 cm$^3$/g;
$M_w$=137 500 g/mol, $M_w/M_n$=2.2;
Melting point 148° C.

EXAMPLE 4

Example 2 was repeated using 7.9 mg of the metallocene rac-dimethylsilylbis(2-methyl-1-phenyl-4-indenyl)-ZrCl$_2$, a polymerization temperature of 50° C. and 3.1±0.4% by volume of hydrogen, affording 18.5 kg of polymer powder.

The powder was found to have the following data:
MFI (230/5)=92 g/10 min; VN=152 cm$^3$/g;
$M_w$=194 500 g/mol, $M_w/M_n$=2.0;
Melting point 159° C.

EXAMPLE 5

Example 3 was repeated with the metered addition of 750 g of ethylene at a uniform rate throughout the total polymerization time, affording 18.2 kg of polymer powder.

The powder was found to have the following data:
ethylene content 3.3% by weight, $n_{PE}$<1.3 (i.e.: isolated incorporation of the ethylene molecules in the polypropylene chain).

MFI (230/5)=90 g/10 min; VN=170 cm$^3$/g;
$M_w$=198 500 g/mol, $M_w/M_n$=2.1;
Melting point 144° C.

EXAMPLE 6

Example 4 was repeated with 2.1±0.3% by volume of hydrogen, affording 19.2 kg of polymer powder.

The powder was found to have the following data:
MFI (230/5)=48 g/10 min; VN=167 cm$^3$/g;
$M_w$=225 000 g/mol, $M_w/M_n$=2.0;
Melting point 160° C.

EXAMPLE 7

A dry 24 dm$^3$ reactor was purged with nitrogen and charged with 12 dm$^3$ of liquid propylene.

Then 35 cm$^3$ of tolueneic methylaluminoxane solution (corresponding to 52 mmol of Al, average degree of oligomerization n=20) were added and the batch was stirred at 30° C. for 15 min.

Separately, 4.0 mg of rac-dimethylsilylbis(2-methyl-1-indenyl)zirconium dichloride were dissolved in 13.5 cm$^3$ of tolueneic methylaluminoxane solution (20 mmol of Al) and left for 15 min for preactivation.

The solution was then introduced into the reactor, heated to 75° C. and held at 78° C. for 1 hour by cooling. The polymerization was terminated by blowing off the excess monomers. The powder was dried at 80° C./200mbar/24 h. The metallocene activity was 435 kg PP/g of metallocene×h.

VN=159 cm$^3$/g; M$_w$=161 500 g/mol, M$_w$/M$_n$=2.1;

MFI (230/5)=109 g/10 min;

Melting point=142° C., n$_{iso}$=36.

EXAMPLE 8

Example 4 was repeated with 8.7±0.5% by volume of hydrogen, affording 19.9 kg of polymer powder.

The powder was found to have the following data:

MFI (230/2.16)=290 g/10 min; VN=91 cm$^3$/g;

M$_w$=92 500 g/mol, M$_w$/M$_n$=1.9;

Melting point 161° C.; II=98.9%, n$_{iso}$=127.

B Molding compositions and melt spinning trials according to the invention (use examples)

EXAMPLE 9

The polymer powder of Example 2 was mixed with 0.05% by weight of pentaerythrityl tetrakis[3-(3,5-di-t-butyl-4-hydroxyphenyl)propionate], 0.05% of tris(2,4-di-t-butylphenyl) phosphite and 0.05% by weight of calcium stearate as additives for improving the oxidation resistance and gliding properties and granulated with a ZSK 28 twin-screw extruder from Werner und Pfleiderer. The temperatures in the five heating zones of the extruder were in this case 150° C. (intake), 220° C., 260° C., 280° C. and 260° C. (die plate). The melt temperature was 265° C., and the extruder screws were operated at 250 rpm. The granules obtained were odorless, colorless and water-clear. To measure the mechanical data, standard shapes were produced by injection molding.

These standard moldings were found to have the following characteristic mechanical data:

MFI (230/2.16)=59 g/10 min; MFI (230/5)=201 g/10 min; BIH (358 N)=69 Nmm$^{-2}$; tensile modulus of elasticity (secant)=1550 Nmm$^{-2}$, Izod impact strength=62 mJmm$^{-2}$; SY=3.7. The processing properties of the molding composition were tested using a laboratory spinning plant (Reifenhäuser 30 extruder, volumetric melt metering pump, temperature controlled spinning pack with 36 holes 0.4 mm in diameter).

The take-off speed used was 2800 m/min. The extrusion speed used was 4.5 m/min and the jet stretch ratio was accordingly 622. The temperature of the melt at the spinneret plate was 265° C.

The fiber was found to have the following data:

Linear density: 36 dtex; tenacity: 45 cN/tex, extensibility: 89%.

EXAMPLE 10

Example 9 was repeated with a spinneret plate melt temperature of 240° C.

Fiber data: linear density 36 dtex; tenacity 43 cN/tex, extensibility: 87%.

EXAMPLE 11

Example 9 was repeated with a spinneret plate melt temperature of 225° C.

Fiber data: linear density 36 dtex; tenacity 42 cN/tex, extensibility: 85%.

EXAMPLE 12

Example 9 was repeated with a spinneret plate melt temperature of 205° C.

Fiber data: linear density 36 dtex; tenacity 44 cN/tex, extensibility: 87%.

Examples 9 to 12 show that it is possible to reduce the melt temperature without adverse effects on the spinnability and on the quality of the fiber or filament. This results in a distinct energy saving. The fact that this is not possible with conventional polymer material will now be shown by Comparative Examples 1 and 2, while Comparative Examples 3 and 4 show that the molding compositions of the invention can be used to produce a fiber or filament of distinctly better tenacity.

Comparative Example 1

Example 12 was repeated using as the polymer instead of the molding composition of the invention a commercial melt-spinning type (Hostalen PPW 1780 F1) having the following data:

MFI (230/5)=198 g/10 min; BIH (358 N)=73 Nmm$^{-2}$; tensile modulus of elasticity (secant)=1550 Nmm$^{-2}$; Izod impact strength=52 mJmm$^{-2}$; SY=5.3; M$_w$=161 000 g/mol; M$_w$/M$_n$=3.9.

Spinning was not possible on account of breakage.

Comparative Example 2

Comparative Example 1 was repeated with a spinneret plate melt temperature of 225° C. (as in Example 11).

Spinning was not possible on account of breakage.

Comparative Example 3

Comparative Example 1 was repeated with a spinneret plate melt temperature of 240° C. (as in Example 10).

Fiber data: linear density 36 dtex; tenacity 28 cN/tex, extensibility 148%.

Comparative Example 4

Comparative Example 1 was repeated with a spinneret plate melt temperature of 265° C.

Fiber data: linear density 36 dtex; tenacity 34 cN/tex, extensibility 93%.

EXAMPLE 13

Example 9 was repeated using the polymer powder of Example 1. The melt temperature at granulation (temperatures: 150° C. (intake), 250° C., 250° C., 280° C. and 260° C. (die plate)) was 270° C., and the extruder screws were operated at 270 rpm. The granules obtained were odorless, colorless and water-clear. To measure the mechanical data, standard shapes were produced by injection molding.

These standard moldings were found to have the following characteristic mechanical data:

MFI (230/2.16)=36 g/10 min, MFI (230/5)=95 g/10 min; BIH=72 Nmm$^{-2}$; tensile modulus of elasticity (secant)= 1600 Nmm$^{-2}$; Izod impact strength=54 mJmm$^{-2}$; SY=3.5.

A spinning trial was carried out as in Example 9.

Fiber data: linear density 36 dtex, tenacity 44 cN/tex, extensibility 92%.

EXAMPLE 14

Example 13 was repeated with a spinneret plate melt temperature of 225° C.

Fiber data: linear density 36 dtex, tenacity 43 cN/tex, extensibility 85%.

EXAMPLE 15

Example 14 was repeated with a take-off speed of 2400 m/min and an extrusion speed of 3.9 m/min.

Fiber data: linear density 36 dtex, tenacity 40 cN/tex, extensibility 89%.

EXAMPLE 16

Example 14 was repeated with an extrusion speed of 3.6 m/min.

Fiber data: linear density 29 dtex, tenacity 42 cN/tex, extensibility 85%.

EXAMPLE 17

Example 14 was repeated with a take-off speed of 3500 m/min and an extrusion speed of 5.6 m/min.

Fiber data: linear density 36 dtex, tenacity 48 cN/tex, extensibility 73%.

EXAMPLE 18

Example 14 was repeated with a take-off speed of 6000 m/min and an extrusion speed of 9.8 m/min.

Fiber data: linear density 36 dtex, tenacity 50 cN/tex, extensibility 65%.

EXAMPLE 19

Example 9 was repeated with the polymer powder of Example 3 being granulated (temperatures: intake 150° C., 240° C., 240° C., 270° C. and 260° C. (die plate), melt temperature 250° C., extruder screw rpm 250) and used for the spinning trials at a spinneret plate melt temperature of 200° C.

Data of molding composition:

MFI (230/2.16)=52 g/10 min;

BIH (358 N)=70 Nmm$^{-2}$;

Tensile modulus of elasticity (secant)=1400 Nmm$^{-2}$;

Izod impact strength=100 mJmm$^{-2}$;

SY=4.0.

Fiber data: linear density 36 dtex, tenacity 40 cN/tex, extensibility 100%.

EXAMPLES 20 TO 24

Example 19 was repeated using the polymer powders of Examples 4 to 8.

Production of molding compositions:

| Example | Polymer of example | Extruder parameters Temperatures (°C.) | | | | | Screw rpm | Melt temperature (°C.) |
|---|---|---|---|---|---|---|---|---|
| | | Intake | Zone I | Zone II | Zone III | Die | | |
| 20 | 4 | 150 | 220 | 260 | 270 | 260 | 250 | 260 |
| 21 | 5 | 140 | 210 | 260 | 270 | 260 | 250 | 255 |
| 22 | 6 | 150 | 220 | 260 | 270 | 260 | 250 | 265 |
| 23 | 7 | 150 | 220 | 250 | 250 | 250 | 300 | 250 |
| 24 | 8 | 150 | 220 | 280 | 280 | 260 | 250 | 270 |

Data of molding compositions:

| Example | MFI (230/2.16) [g/19 min] | BIH (358 N) [Nmm$^{-2}$] | Tensile modulus of elasticity [Nmm$^{-2}$] | SY |
|---|---|---|---|---|
| 20 | 31 | 82 | 1750 | 3.5 |
| 21 | 32 | 65 | 1450 | 4.0 |
| 22 | 16 | 79 | 1700 | 3.0 |
| 23 | 40 | 64 | 1300 | 3.2 |
| 24 | 305 | 90 | 1800 | 3.7 |

The spinning trials were carried out with a take-off speed of 2800 m/min and an extrusion speed of 4.5 m/min. The spinneret plate melt temperature was 225° C. in Examples 20 and 22, 205° C. in Examples 21 and 24 and 185° C. in Example 23.

Data of fibers produced:

| Example | Linear density [dtex] | Tenacity [cN/tex] | Extensibility [%] |
|---|---|---|---|
| 20 | 36 | 47 | 80 |
| 21 | 36 | 39 | 96 |
| 22 | 36 | 46 | 85 |
| 23 | 36 | 40 | 90 |
| 24 | 36 | 46 | 78 |

EXAMPLE 25

Example 1 was repeated with 4.0 mg of rac-dimethylsilyl-bis(2-methyl-4-(1-naphthyl)-1-indenyl)zirconium dichloride as the metallocene, a polymerization temperature of 65° C., a polymerization time of 6 h and a hydrogen content in the reactor of 6.0±0.2% by volume, affording 23.4 kg of polymer powder.

The powder was found to have the following data:

MFI (230/2.16)=1000 g/10 min; VN=71 cm$^3$/g;

M$_w$=75400 g/mol, M$_w$/M$_n$=2.0; melting point 165° C., II=99.5%.

Example 9 was followed to produce a molding composition according to the invention from the powder by extrusion. The melt temperature was 245° C. and the extruder screws operated at 3000 rpm. To measure the mechanical data, standard shapes were produced by injection molding.

These standard moldings were found to have the following mechanical data:

MFI (230/2 16)=990 g/10 min; BIH (358 N)=110 Nmm$^{-2}$;

tensile modulus of elasticity (secant)=1925 Nmm$^{-2}$;

SY 3.5.

The processability of the molding composition was tested on a laboratory spinning plant by the method of Example 9.

A take-off speed of 6000 m/min was used. The extrusion speed was 9.8 m/min and the jet stretch ratio was thus 612. The spinneret plate melt temperature was 180° C.

The fiber was found to have the following data:

Linear density: 36 dtex; tenacity: 50 cN/tex; extensibility: 69%.

EXAMPLE 26

Example 25 was repeated with rac-dimethylsilylbis-(2-methyl-4,5-benzo-1-indenyl)zirconiumdichloride as the metallocene and a hydrogen content in the reactor of 4.2±0.1% by volume.

The powder was found to have the following data:

MFI (230/2 16)=978 g/10 min; VN=75 cm$^3$/g;

$M_w$=78400 g/mol, $M_w/M_n$=2.3; melting point 149° C., II=97.1%, $n_{iso}$=61.

The standard injection moldings were found to have the following mechanical data:

MFI (230/2 16)=995 g/10 min; BIH (358 N)=81 Nmm$^{-2}$;

tensile modulus of elasticity (secant)=1690 Nmm$^{-2}$; SY=4.0.

The high speed spinning trial results were:

Linear density 36 dtex; tenacity 48 cN/tex; extensibility 86%.

EXAMPLE 27

Example 25 was repeated with rac-dimethylsilylbis-(2-ethyl-4-phenyl-1-indenyl)zirconium dichloride and a hydrogen content in the reactor of 5.0±0.2% by volume.

The powder was found to have the following data:

MFI (230/2.16)=920 g/10 min; VN=82 cm$^3$/g;

$M_w$=80 000 g/mol, $M_w/M_n$ 2.1; melting point 163° C., II=99.3%.

The standard injection moldings were found to have the following mechanical data:

MFI (230/2.16)=945 g/10 min; BIH (358 N)=105 Nmm$^{-2}$;

tensile modulus of elasticity ( secant )=1895 Nmm$^{-2}$; SY=3.0.

The high speed spinning trial results were:

Linear density 36 dtex; tenacity 49 cN/tex; extensibility 73%.

Examples 25 to 27 show the excellent processability and the very good product properties of the low molecular weight polymers of the invention; of particular note are the very high take-off speeds and the comparatively low temperatures at the spinneret plate and also the very high tenacity.

What is claimed is:

1. A melt spun material comprising a polyolefin molding composition which comprises a polyolefin formed from an olefin having at least 3 carbon atoms of the formula R$^a$—CH=CH—R$^b$, where R$^a$ and R$^b$ are a hydrogen or C$_1$–C$_{15}$-alkyl, straight-chain or branched, and are identical or different, except that R$^a$ and R$^b$ cannot both be hydrogen, and from 0 to 10% by weight of ethylene or of a second olefin having the abovementioned meaning as comonomer, characterized by a 23012.16 MFI from 5 to 1000 g/10 min, a 230/5 MFI from 15 to 3000 g/10 min, a molecular weight ($M_w$) from 75,000 to 350,000 g/mol, a polydispersity ($M_w/M_n$) from 1.8 to 3.5, a viscosity number from 70 to 3000 cm$^3$/g, a melting point from 120° to 165° C., an isotactic block length from 25 to 150, and ether extractables less than 2% weight, based on the total weight of the polymer.

2. The melt spun material of claim 1 wherein the polyolefin is polypropylene.

3. The melt spun material of claim 1, wherein the polyolefin molding composition further comprises one or more additives selected from the group consisting of nucleating agents, stabilizers, antioxidants, UV absorbers, photoprotectants, metal deactivators, free-radical scavengers, gildants, emulsifiers, pigments, optical brighteners, flame retardants or antistats.

4. The melt spun material of claim 1, wherein the material is made by high speed melt spinning.

5. The textile material of claim 1 which is a fiber.

6. The textile material of claim 1 which is a filament.

7. The textile material of claim 1 which is a web.

8. A melt spun material comprising a polyolefin molding composition which comprises a polyolefin produced by polymerizing or copolymerizing an olefin having at least 3 carbon atoms of the formula R$^a$—CH=CH—R$^b$, where R$^a$ and R$^b$ are a hydrogen or C$_1$-C$_{15}$-alkyl, straight-chain or branched, and are identical or different, except that R$^a$ and R$^b$ cannot both be hydrogen, and from 0 to 10% by weight of ethylene or of a second oldin having the abovementioned meaning as comonomer and absent treatment of the produced polyolefin with a peroxide, characterized by a 230/2.16 MFI from 5 to 1000 g/10 min, a 230/5 MFI from 15 to 3000 g/10 min, a molecular weight ($M_w$) from 75,000 to 350,000 g/mol, a polydispersity ($M_w/M_n$) from 1.8 to 3.5, a viscosity number from 70 to 3000 cm$^3$/g, 8 melting point from 120° to 165° C., an isotactic block length from 25 to 150, and ether extractables less than 2% weight, based on the total weight of the polymer.

9. The melt spun material of claim 7, wherein the polyolefin is polypropylene.

10. The melt spun material of claim 7, wherein the polyolefin molding composition further comprises one or more additives selected from the group consisting of nucleating agents, stabilizers, antioxidants, UV absorbers, photoprotectants, metal deactivators, free-radical scavengers, gildants, emulsifiers, pigments, optical brighteners, flame retardants or antistats.

11. The melt spun material of claim 7, wherein the material is produced by high speed melt spinning.

12. The melt spun material of claim 7 which is a fiber.

13. The melt spun material of claim 7 which is a filament.

14. The melt spun material of claim 7 which is a web.

15. The melt spun material of claim 1, wherein a metallocene catalyst system is used to produce the polyolefin molding composition.

16. The melt spun material of claim 8, wherein a metallocene catalyst system is used to produce the polyolefin molding composition.

* * * * *

UNITED STATES PATENT AND TRADEMARK OFFICE
CERTIFICATE OF CORRECTION

PATENT NO.   :  5,637,666
DATED        :  June 10, 1997
INVENTOR(S)  :  Winter et al.

It is certified that error appears in the above-identified patent and that said Letters Patent are hereby corrected as shown below:

Claim 1, col. 10, line 3, "23012.16 MFI" should be --230/2.16 MFI--.
Claim 3, col. 10, line 17, "gildants" should be --glidants--.
Claim 10, col. 10, line 48, "gildants" should be --glidants--.

Signed and Sealed this

Nineteenth Day of August, 1997

BRUCE LEHMAN

Attest:

Attesting Officer

Commissioner of Patents and Trademarks